United States Patent [19]

Boissac

[11] Patent Number: 5,720,072
[45] Date of Patent: Feb. 24, 1998

[54] MOTOR VEHICLE SCREEN WIPER OF THE TYPE ADAPTED FOR RELIEF OF WIPING PRESSURE IN THE PARKED POSITION

[75] Inventor: Jean-Paul Boissac, Chatellerault, France

[73] Assignee: Valeo Systemes D'Essuyage, La Verriere, France

[21] Appl. No.: 610,877

[22] Filed: Mar. 5, 1996

[30] Foreign Application Priority Data

Mar. 6, 1995 [FR] France .................. 95 02683

[51] Int. Cl.$^6$ .................. B60S 1/04; B60S 1/32
[52] U.S. Cl. .................. 15/250.19; 15/250.351
[58] Field of Search .................. 15/250.19, 250.16, 15/250.001, 250.351, 250.352, 250.202

[56] References Cited

U.S. PATENT DOCUMENTS

| | | | |
|---|---|---|---|
| 2,284,844 | 6/1942 | Rappl | 15/250.19 |
| 4,040,141 | 8/1977 | O'Steen | 15/250.19 |
| 4,345,352 | 8/1982 | Terabayashi | 15/250.19 |
| 4,765,019 | 8/1988 | Ochino | 15/250.19 |
| 4,856,137 | 8/1989 | Pala | 15/750.352 |
| 5,101,531 | 4/1992 | Edwards et al. | 15/250.19 |

FOREIGN PATENT DOCUMENTS

| | | | |
|---|---|---|---|
| 2526382 | 11/1983 | France | 15/250.391 |
| 2636582 | 3/1990 | France | |
| 882809 | 7/1953 | Germany | 15/250.19 |
| 10 87 482 | 8/1960 | Germany | |
| 63551 | 4/1983 | Japan | 15/250.19 |
| 100035 | 6/1984 | Japan | 15/250.19 |
| 179437 | 10/1984 | Japan | 15/250.19 |
| 60354 | 3/1986 | Japan | 15/250.19 |
| 113636 | 5/1987 | Japan | 15/250.351 |
| 156070 | 10/1987 | Japan | 15/250.19 |

*Primary Examiner*—Gary K. Graham
*Attorney, Agent, or Firm*—Morgan & Finnegan, LLP

[57] ABSTRACT

A motor vehicle screen wiper comprising a wiper blade which is applied against a swept surface by means of a wiper arm articulated on a drive head, so as to be driven by the latter in alternate wiping movement over the swept surface, includes a projecting element or lifting tab carried by the wiper arm. When the wiper is in its parked position, this lifting tab cooperates with an engagement face of a ramp which is fixed on the vehicle, so as to displace the wiper arm in such a way that the wiper blade tends to be separated from the swept surface, so as to reduce or eliminate the pressure with which the blade is applied to the swept surface in the parked position of the wiper. The lifting tab is made integral with the wiper arm.

4 Claims, 2 Drawing Sheets

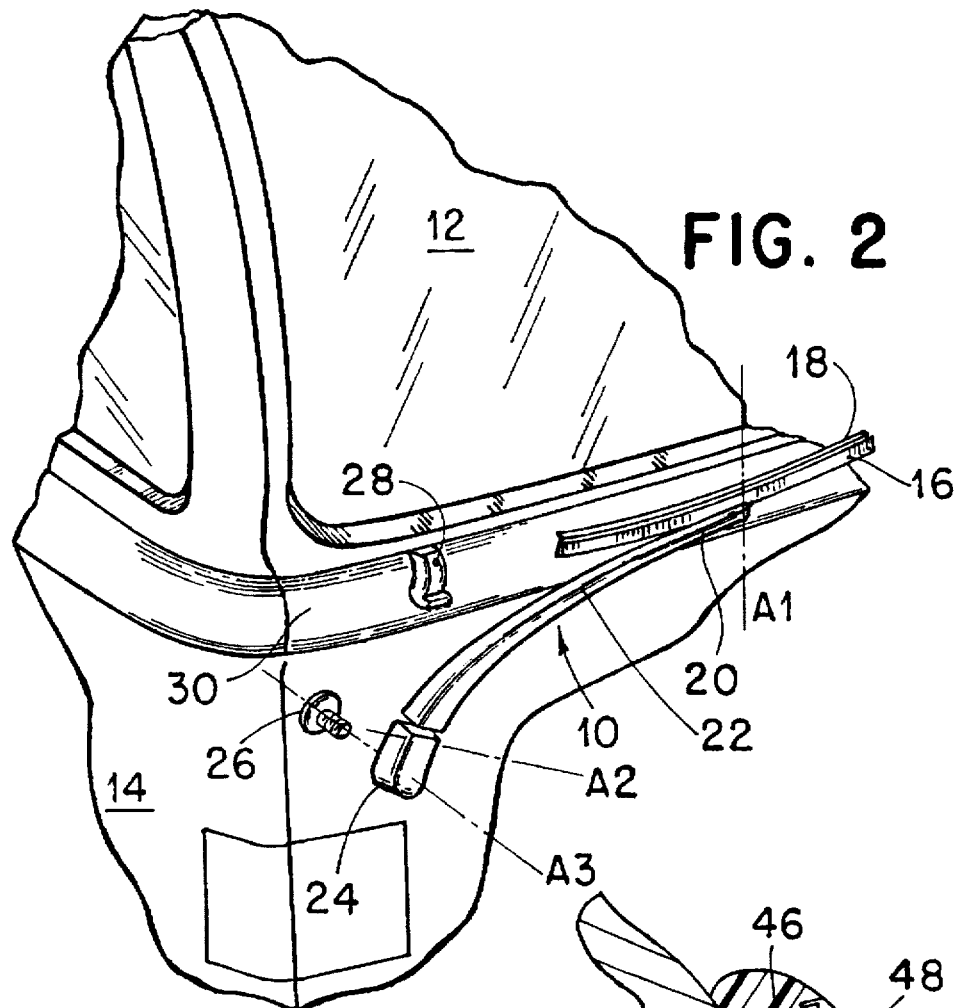
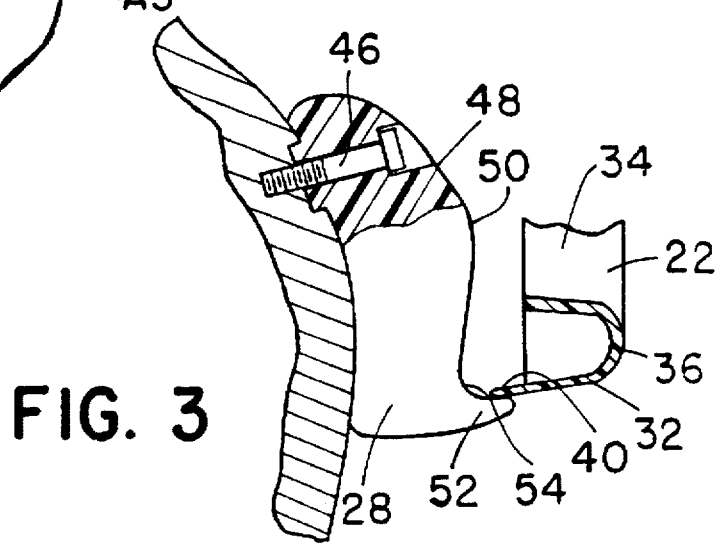
FIG. 2
FIG. 3

MOTOR VEHICLE SCREEN WIPER OF THE TYPE ADAPTED FOR RELIEF OF WIPING PRESSURE IN THE PARKED POSITION

FIELD OF THE INVENTION

The present invention relates to screen wipers apparatus for motor vehicles, and more particularly, to motor vehicle screen wipers of the type comprising a screen wiper blade adapted to be held against a glass surface to be swept (for example the windshield or rear window of the vehicle), by a screen wiper arm which is articulated on a drive head to be driven by the latter in alternate oscillating movement of the screen wiper. The arm includes a camming element or lifting tab. The lifting claw is carried by the wiper arm and which, when the wiper is in its rest or parked position, cooperates with an engagement surface of a ramp fixed on the vehicle for that purpose, whereby to lift the wiper arm in such a way that the wiping pressure, with which the screen wiper blade is applied on the glass, is reduced or eliminated when the wiper is in its parked position.

BACKGROUND OF THE INVENTION

When the wiper is in its parked position, that is to say when it is not operating, it is not desirable that a significant pressure should be applied by the screen wiper arm on the wiper blade, so that there is a continuous force exerted by the blade in contact with the glass. In this connection, this wiping or application pressure, if applied over a long period, tends to deform the wiping strip of the blade irreversibly, and also tends to cause the wiper blade to adhere to the glass.

Arrangements are known in which the pressure with which the blade is applied on the glass is relieved when the wiper is in its parked position. In particular, it is known to use for this purpose a tab, or projecting element, which is a separate component fitted on the screen wiper arm, and which cooperates with a ramp fixed on the vehicle itself. This cooperation is such that the wiper arm is lifted slightly so as to displace the wiping strip away from the glass enough to somewhat relieve the pressure applied to the wiper blade.

However, the presence of such a component fitted on the wiper arm constitutes a protuberance which detracts from the appearance of the screen wiper. In addition, it increase the number of components necessary for the construction of the screen wiper.

DISCUSSION OF THE INVENTION

An object of the invention is to overcome the above mentioned drawbacks.

According to the invention, a motor vehicle screen wiper, comprising a screen wiper blade adapted to be applied against a swept surface by a screen wiper arm, which is articulated on a drive head and arranged to be driven by the latter in alternate wiping movement over the swept surface, the wiper arm having a projecting element which, when the wiper is in a parked position, cooperates with an engagement face of a ramp fixed on the vehicle whereby to displace the wiper arm in a direction away from the swept surface, thereby at least reducing, in the parked position of the wiper, the pressure with which the blade is applied on the swept surface, is characterised in that the projecting element is a lifting tab integral with the wiper arm.

According to a preferred feature of the invention, the wiper arm with its integral lifting claw is made by moulding.

According to another preferred feature of the invention, the wiper arm with its lifting tab are made in a plastics material.

According to a further preferred feature of the invention, the screen wiper arm comprises two parallel, opposed, side wing portions joined through their upper edges by a back portion which is substantially parallel to the plane of the swept surface when the wiper is mounted on the vehicle, and the tab extends a lower edge of one of the two wing portions, to project towards the ramp.

According to yet another preferred feature of the invention, the ramp includes a further projecting element, or engagement lug, which projects substantially at right angles to the swept surface, and which cooperates with the projecting element of the wiper arm so as to determine the angular orientation of the screen wiper in its parked position.

Further features and advantages of the invention will appear more clearly on a reading of the following detailed description of a preferred embodiment of the invention, which is given by way of example and with reference to the accompanying drawings.

BRIEF DESCRIPTION OF THE DRAWINGS

FIG. 2 is a perspective view showing the mounting of a screen wiper in accordance with the invention, for wiping the rear window of a motor vehicle.

FIG. 3 is a view in cross section of a screen wiper arm in accordance with the invention, together with a ramp which is fixed on a motor vehicle.

DESCRIPTION OF A PREFERRED EMBODIMENT OF THE INVENTION

Figure 1:
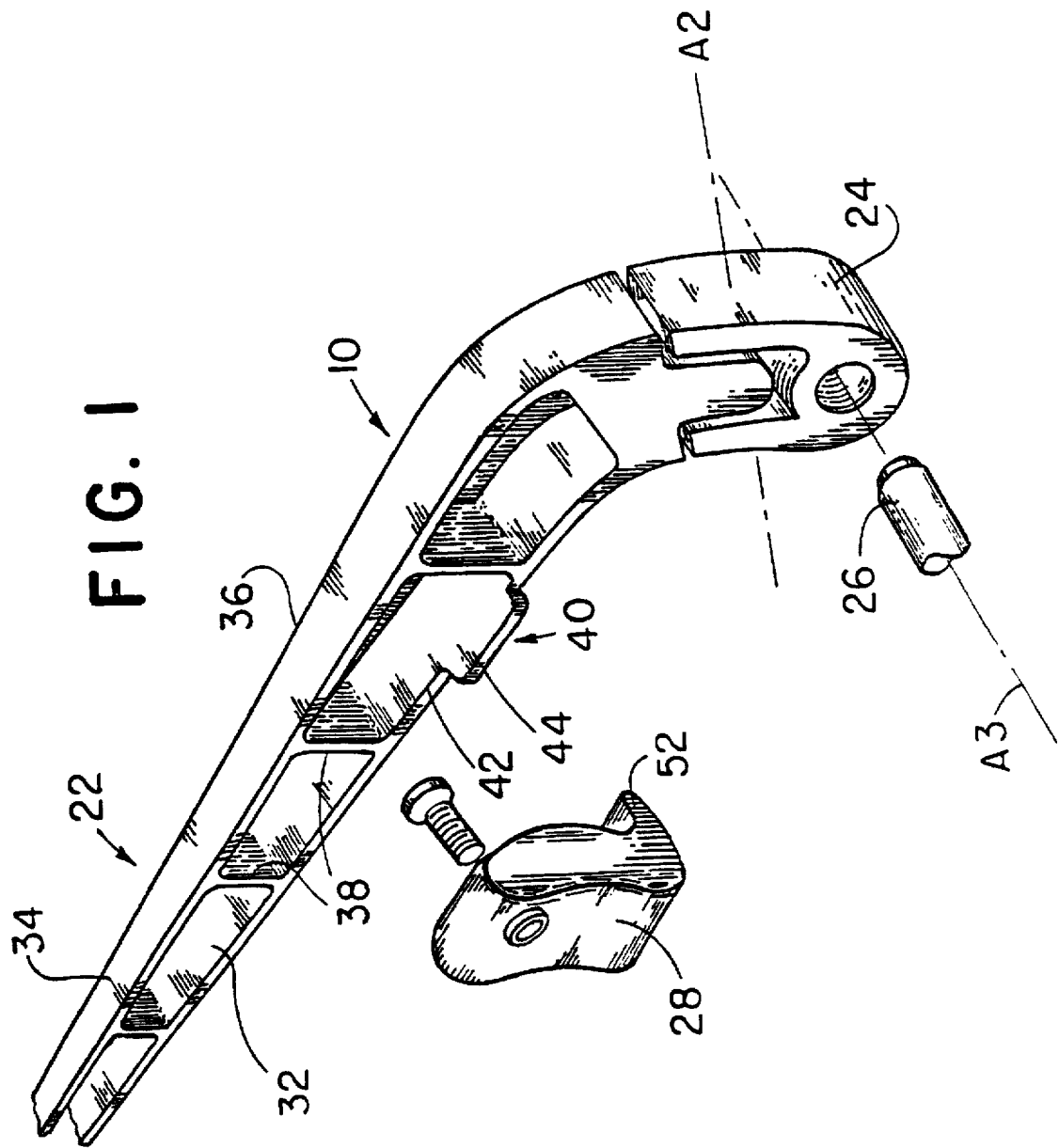
FIG. 1 is a perspective view showing a ramp and part of a screen wiper arm in accordance with the invention.

Reference is first made to FIG. 2, which shows a screen wiper 10 arranged for wiping a rear window 12 of a motor vehicle 14. The wiper 10 consists essentially of a screen wiper blade 16 which is articulated on the free end 20 of a screen wiper arm 22, for pivoting movement about an axis A1 which is substantially parallel to the plane of the rear window 12. The wiper blade 16 includes a wiping strip 18 for wiping the window 12. The wiper arm 22 is pivoted on a drive head 24, about an axis A2 which is substantially parallel to the plane of the rear window 12.

The drive head 24 is carried on the end of a drive spindle 26 for driving the screen wiper 10 in alternate oscillating movement about an axis A3 which is substantially at right angles to the plane of the rear window 12.

The motor vehicle 14 also carries a ramp 28 which is fixed on a bodywork panel 30 at the base of the rear window 12. The ramp 28 is arranged to cooperate with the wiper arm 22 in order to lift the screen wiper 10 when the latter is in the parked position, and more particularly to relieve the engagement of the wiping strip 18 on the glass 12.

FIG. 1, to which reference is now made, shows the wiper arm 22 and the ramp 28 in greater detail. In this embodiment, which is a preferred version of the product according to the invention, the screen wiper arm 22 is a moulded component, which may in particular be made in a plastics material. This known technique enables a screen wiper arm 22 to be made light in weight and in a suitable form which is readily adaptable to aesthetic requirements.

The screen wiper arm 22 in FIG. 1 comprises, in particular, two parallel side wing portions 32 and 34 in facing relationship to each other. The wing portions 32 and 34, which lie substantially at right angles to the plane of the rear window 12 (FIG. 2), are joined together at their upper edges by an upper or back portion 36 which is substantially parallel to the plane of the glass 12. In order to provide sufficient rigidity of the wiper arm 22, both in bending and in torsion, ribs 38 are also provided. These ribs lie in the space defined between the two side wing portions 32 and 34 and the upper back portion 36.

The screen wiper arm 22 has a projecting element in the form of a camming lug or lifting tab 40, which is integral or of one piece with the remainder of the screen wiper arm 22.

In the preferred embodiment shown in the drawings, the lifting tab 40 is made in the form of an extension of the side wing portion 32 of the screen wiper arm 22. This is the wing portion which is arranged to be the first to make contact with the ramp 28. The tab 40 is arranged on an inner edge 42 of the wing portion 32, and it extends substantially towards the window 12.

The lifting tab 40 has a thickness which is substantially equal to that of the side wing portion 32, and its lower edge 44, facing towards the rear window 12, constitutes an application or engagement surface for cooperation with the ramp 28. The lower edge is directly below the upper and inner edges such that a line which passes through the lower edge and upper edge must also pass through the inner edge.

As can be seen in particular in FIG. 3, the ramp 28 is fixed on the body panel of the vehicle, for example by means of a screw 46. The ramp 28 includes an inclined engagement plane 48 which is extended downwardly by an engagement surface 50, the surface 50 being substantially parallel to the plane of the window.

The ramp 28 also includes a projecting lug 52 which projects transversely from the lower edge 54 of the engagement surface 50. The engagement lug 52 is arranged to cooperate with the lifting tab 40 to determine the angular parked position of the screen wiper 10.

When the screen wiper 10 is in operation, it is displaced in its alternate wiping movement about the axis A3. When the driver stops the operation of the screen wiper 10, the wiper arm 22 is moved downwardly with respect to the ramp 28, with reference to FIG. 2, so as to arrive at the parked, or "parking", position shown in FIG. 3.

During its movement, the lifting tab 40 of the wiper arm 22 makes contact with the inclined engagement plane 48 of the ramp 28, thus progressively raising the screen wiper arm 22. The lifting tab 40 then continues its vertical movement by sliding on the engagement surface 50 of the ramp 28, until it reaches the level of the lower edge 54 adjacent to the engagement lug 52.

The cooperation of the tab 40 with the ramp 28 thus enables the screen wiper 10 to be lifted. It also sets the angular orientation of the screen wiper in the parked position of the latter.

What is claimed is:

1. In a motor vehicle having a screen wiper apparatus for wiping a glazed surface thereof, the apparatus comprising: a screen wiper consisting of a drive head, a wiper arm articulated on the drive head, and a wiper blade carried by the wiper arm whereby the arm applies a wiping pressure to urge the blade against the glazed surface; means coupled to the drive head for moving the screen wiper in alternate wiping motion over the glazed surface and for putting the wiper in a parked position; and a ramp having a sloping engagement surface for lifting said wiper arm, said ramp fixed on the vehicle, said arm having a lifting tab, the ramp being located on the vehicle for cooperation of its engagement surface with the lifting tab when the wiper is in its parked position, whereby to at least partially relieve said wiping pressure, wherein said tab is of one piece with the wiper arm, the motor vehicle defining a plane in which said glazed surface lies, wherein the wiper arm has two opposed elongated wing portions, each of said wing portions having a first elongated, lateral edge and a second elongated, lateral edge, and a back portion joining said first elongated, lateral edges together and being substantially parallel to said plane, said tab projecting transversely from the second elongated, lateral edge of one of said wing portions towards said ramp to define an elongated third edge which engages said ramp engagement surface as the wiper moves to the parked position to lift said arm, said third elongated edge being parallel to said second elongated edge and said tab being formed such that any line passing through the first edge of said one wing portion and the third edge must also pass through said second edge of said one wing portion.

2. In a motor vehicle according to claim 1, wherein the wiper arm, with said tab, is molded.

3. In a motor vehicle according to claim 2, wherein the wiper arm, with said tab, is of a plastics material.

4. In a motor vehicle according to claim 1, wherein said ramp includes an engagement lug projecting at right angles to its engagement surface, said lug being configured to cooperate with said tab in the parked position of the wiper to define an angular orientation of the wiper in said parked position.

* * * * *